United States Patent
Janko et al.

(10) Patent No.: US 11,121,661 B2
(45) Date of Patent: Sep. 14, 2021

(54) MINIMIZING TRANSDUCER SETTLING TIME

(71) Applicant: Cirrus Logic International Semiconductor Ltd., Edinburgh (GB)

(72) Inventors: Marco Janko, Austin, TX (US); Emmanuel Marchais, Dripping Springs, TX (US); Carl Ståhl, Malmö (SE)

(73) Assignee: Cirrus Logic, Inc., Austin, TX (US)

( * ) Notice: Subject to any disclaimer, the term of this patent is extended or adjusted under 35 U.S.C. 154(b) by 4 days.

(21) Appl. No.: 16/702,929

(22) Filed: Dec. 4, 2019

(65) Prior Publication Data

US 2020/0403546 A1 Dec. 24, 2020

Related U.S. Application Data

(60) Provisional application No. 62/864,086, filed on Jun. 20, 2019.

(51) Int. Cl.
*H02P 25/034* (2016.01)
*G08B 6/00* (2006.01)

(52) U.S. Cl.
CPC .............. *H02P 25/034* (2016.02); *G08B 6/00* (2013.01)

(58) Field of Classification Search
CPC ......... H02P 25/034; G08B 6/00; G06F 3/016; B06B 1/0261
See application file for complete search history.

(56) References Cited

U.S. PATENT DOCUMENTS

| | | | |
|---|---|---|---|
| 8,659,208 B1 | 2/2014 | Rose et al. | |
| 9,355,536 B2* | 5/2016 | Crawley | G08B 6/00 |
| 2005/0134562 A1 | 6/2005 | Grant et al. | |
| 2010/0153845 A1* | 6/2010 | Gregorio | G06F 3/041 |
| | | | 715/702 |
| 2011/0090148 A1* | 4/2011 | Li | G06F 3/0354 |
| | | | 345/158 |
| 2011/0194029 A1* | 8/2011 | Herrmann | H04N 13/398 |
| | | | 348/569 |
| 2012/0235902 A1* | 9/2012 | Eisenhardt | G06F 3/012 |
| | | | 345/156 |
| 2014/0247227 A1* | 9/2014 | Jiang | G06F 3/016 |
| | | | 345/173 |
| 2016/0211736 A1* | 7/2016 | Moussette | H02K 33/16 |
| 2017/0150273 A1* | 5/2017 | Afshar | H04R 9/06 |
| 2020/0313654 A1 | 10/2020 | Marchais et al. | |

OTHER PUBLICATIONS

International Search Report and Written Opinion of the International Searching Authority, International Application No. PCT/US2020/036756, dated Sep. 22, 2020.

* cited by examiner

*Primary Examiner* — Rina I Duda
(74) *Attorney, Agent, or Firm* — Jackson Walker L.L.P.

(57) ABSTRACT

A method for minimizing settling of a moving mass of an electromagnetic load may include determining a polarity and a magnitude of a velocity of the moving mass based on real time measurements of one or more parameters associated with the electromagnetic load and based on the polarity and the magnitude of the velocity, generating a braking signal to be applied to the moving mass that opposes the polarity of the velocity.

22 Claims, 3 Drawing Sheets

MINIMIZING TRANSDUCER SETTLING TIME

RELATED APPLICATIONS

The present disclosure claims priority to U.S. Provisional Patent Application Ser. No. 62/864,086, filed Jun. 20, 2019, which is incorporated by reference herein in its entirety.

FIELD OF DISCLOSURE

The present disclosure relates in general to minimizing a settling time of a transducer after a playback waveform is applied to the transducer, by using an active braking.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin, and may play increasing roles in human-machine interactions for modern devices.

An LRA may be modelled as a mass-spring electromechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

FIG. 1 illustrates an example of a vibro-haptic system in a device 100. Device 100 may comprise a controller 101 configured to control a signal applied to an amplifier 102. Amplifier 102 may then drive a vibrational actuator (e.g., haptic transducer) 103 based on the signal. Controller 101 may be triggered by a trigger to output to the signal. The trigger may for example comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2\pi\sqrt{CM}} \quad (1)$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping of the device, the vibration resonance of the haptic transducer may vary from time to time.

FIG. 2 illustrates an example of a linear resonant actuator (LRA) modelled as a linear system. LRAs are non-linear components that may behave differently depending on, for example, the voltage levels applied, the operating temperature, and the frequency of operation. However, these components may be modelled as linear components within certain conditions. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

Often, LRAs used in mobile devices are designed to have a resonant frequency $f_0$ in the range of 100 Hz-250 Hz. This resonance characteristic implies, in most cases, a relatively large acceleration rise time. Additionally, after the LRA is in motion, decreasing the amplitude of the input voltage will not decrease the output amplitude of the LRA instantaneously. Instead, an LRA may exhibit post-playback settling, which may reduce the "crispness" of haptic feeling to a user.

Such settling time may also constrain the design of haptic effects by limiting the time in which stimuli is generated, and limiting the sharpness of stimuli delivered. This limitation leads to a necessity to develop approaches to accurately control settling time, often referred to as active braking. Several existing approaches perform active braking in an open-loop manner. While some closed-loop approaches are also available, such approaches often require extensive memory and processing resources and are sensitive to noise and delays.

SUMMARY

In accordance with the teachings of the present disclosure, the disadvantages and problems associated with existing approaches for minimizing transducer settling time may be reduced or eliminated.

In accordance with embodiments of the present disclosure, a method for minimizing settling of a moving mass of an electromagnetic load may include determining a polarity and a magnitude of a velocity of the moving mass based on real time measurements of one or more parameters associated with the electromagnetic load and based on the polarity and the magnitude of the velocity, generating a braking signal to be applied to the moving mass that opposes the polarity of the velocity.

In accordance with these and other embodiments of the present disclosure, a system for minimizing settling of a moving mass of an electromagnetic load may include one or more inputs for receiving real time measurements of one or more parameters associated with the electromagnetic load and a processing subsystem configured to determine a polarity and a magnitude of a velocity of the moving mass based on real time measurements of one or more parameters associated with the electromagnetic load and based on the polarity and the magnitude of the velocity, generate a braking signal to be applied to the moving mass that opposes the polarity of the velocity.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus, and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal may generally be an analog time varying voltage signal, for example, a time varying waveform.

Figure 3:
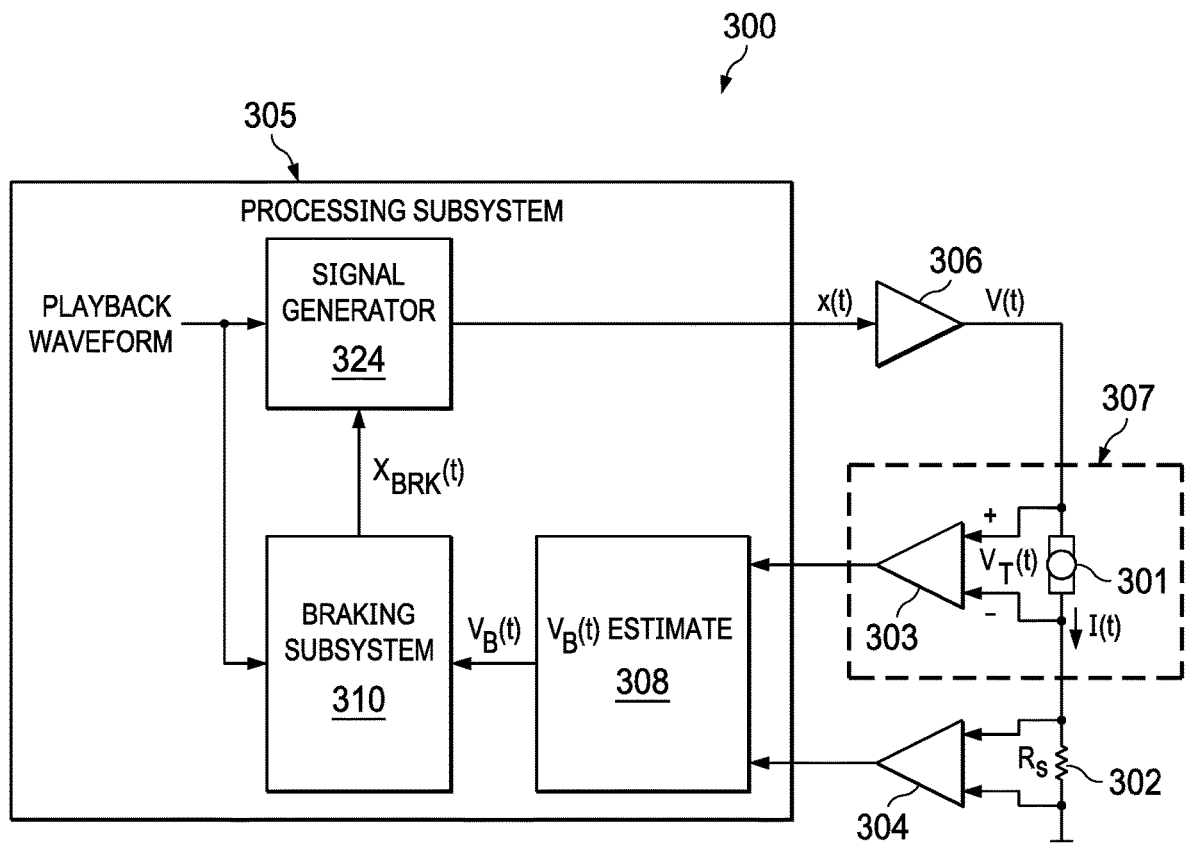
FIG. 3 illustrates selected components of an example host device incorporating force sensing using an electromagnetic load of the host device, in accordance with embodiments of the present disclosure.

FIG. 3 illustrates selected components of an example host device 300 incorporating force sensing using an electromagnetic load 301 of host device 300, in accordance with embodiments of the present disclosure. Host device 300 may include, without limitation, a mobile device, home application, a vehicle, and/or any other system, device, or apparatus that includes a human-machine interface.

Electromagnetic load 301 may include any suitable load with a complex impedance, including without limitation a haptic transducer, a loudspeaker, a microspeaker, a piezoelectric transducer, or other suitable transducer.

In operation, a signal generator 324 of a processing subsystem 305 of host device 300 may generate a signal x(t) (which, in some embodiments, may be a waveform signal, such as a haptic waveform signal or audio signal). Signal x(t) may be generated based on a desired playback waveform received by signal generator 324. Signal x(t) may in turn be amplified by amplifier 306 to generate the driving signal V(t) for driving electromagnetic load 301. Responsive to driving signal V(t), a sensed terminal voltage $V_T(t)$ of electromagnetic load 301 may be converted to a digital representation by a first analog-to-digital converter (ADC) 303. Similarly, sensed current I(t) may be converted to a digital representation by a second ADC 304. Current I(t) may be sensed across a shunt resistor 302 having resistance $R_s$ coupled to a terminal of electromagnetic load 301. The terminal voltage $V_T(t)$ may be sensed by a terminal voltage sensing block 307, for example a volt meter.

Figure 1:
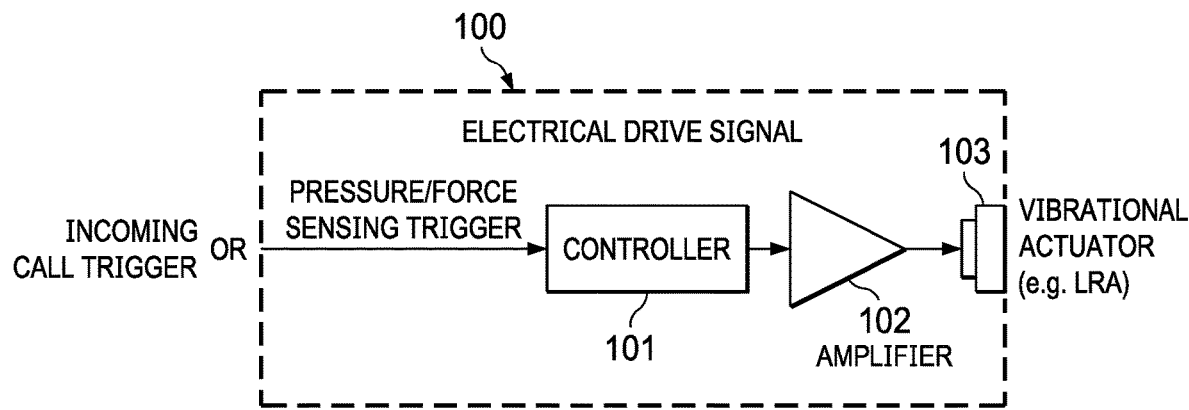
FIG. 1 illustrates an example of a vibro-haptic system in a device, as is known in the art.
Figure 2:
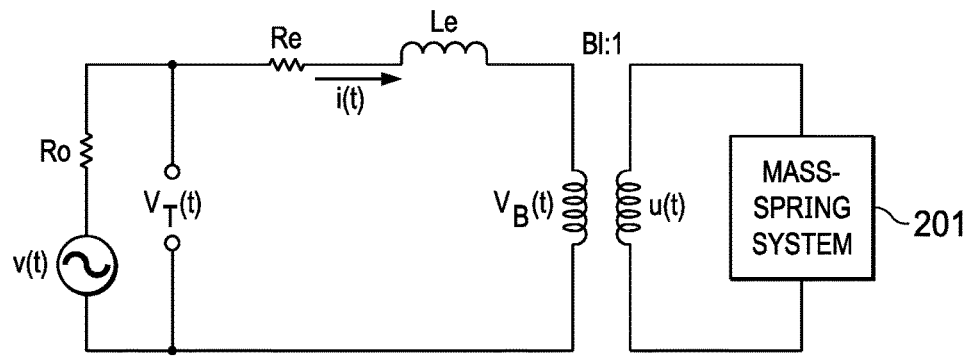
FIG. 2 illustrates an example of a Linear Resonant Actuator (LRA) modelled as a linear system, as is known in the art.

As shown in FIG. 3, processing subsystem 305 may include a back-EMF estimate block 308 that may estimate back-EMF voltage $V_B(t)$. In general, back EMF voltage $V_B(t)$ may not be directly measured from outside of the haptic transducer. However, the terminal voltage $V_T(t)$ measured at the terminals of the haptic transducer may be related to $V_B(t)$ by:

$$V_T(t) = V_B(t) + Re \cdot I(t) + Le \cdot \frac{dI(t)}{dt} \quad (2)$$

where the parameters are defined as described with reference to FIG. 2. Consequently, back-EMF voltage $V_B(t)$ may be estimated according to equation (2) which may be rearranged as:

$$V_B(t) = V_T(t) - Re \cdot I(t) - Le \frac{dI(t)}{dt} \quad (3)$$

Because back-EMF voltage $V_B(t)$ may be proportional to velocity of the moving mass of electromagnetic load 301, back-EMF voltage $V_B(t)$ may in turn provide an estimate of such velocity.

In some embodiments, back-EMF estimate block 308 may be implemented as a digital filter with a proportional and parallel difference path. The estimates of DC resistance Re and inductance Le may not need to be accurate (e.g., within an approximate 10% error may be acceptable), and thus, fixed values from an offline calibration or from a data sheet specification may be sufficient. As an example, in some embodiments, back-EMF estimate block 308 may determine estimated back-EMF voltage $V_B(t)$ in accordance with the teachings of U.S. patent application Ser. No. 16/559,238, filed Sep. 3, 2019, which is incorporated by reference herein in its entirety.

Based on such estimated back-EMF voltage $V_B(t)$, a braking subsystem 310 of processing subsystem 305 may generate a braking signal $x_{BRK}(t)$, in order to minimize a post-playback settling time of electromagnetic load 301, as described in greater detail below. Signal generator 324 may receive braking signal $x_{BRK}(t)$ and sum it with a playback waveform to generate signal x(t) communicated to amplifier 306.

In general, braking subsystem 310 may, at the conclusion of a playback waveform, generate braking signal $x_{BRK}(t)$ as a piecewise square signal with an amplitude in each piece of the square given by:

$$A_{BRK} = -K_{BRK}\frac{dV_B(t)}{dt} \text{ when } V_B(t) = 0 \qquad (4)$$

where $K_{BRK}$ is an arbitrary positive gain constant which may be determined for each model or type of electromagnetic load 301.

Thus, braking subsystem 310 may reverse polarity of the braking signal at the zero crossings of the velocity of the moving mass of electromagnetic load 301, which may be given by zero crossings of estimated back-EMF voltage $V_B(t)$. Further, braking subsystem 310 may, for each piece of braking signal $x_{BRK}(t)$, adaptively determine an amplitude of such piece based on the derivative with respect to time at the previous zero crossing of estimated back-EMF voltage $V_B(t)$. Accordingly, braking subsystem 310 may cause amplitude of braking signal $x_{BRK}(t)$ to be reduced as the moving mass of electromagnetic load 301 is decelerated, to prevent reacceleration in the opposite direction. The derivative with respect to time at the previous zero crossing of estimated back-EMF voltage $V_B(t)$ may provide an indication of the instantaneous oscillation amplitude of estimated back-EMF voltage $V_B(t)$, and thus may provide a magnitude scalar to adapt amplitude $A_{BRK}$ of braking signal $x_{BRK}(t)$.

Figure 4:
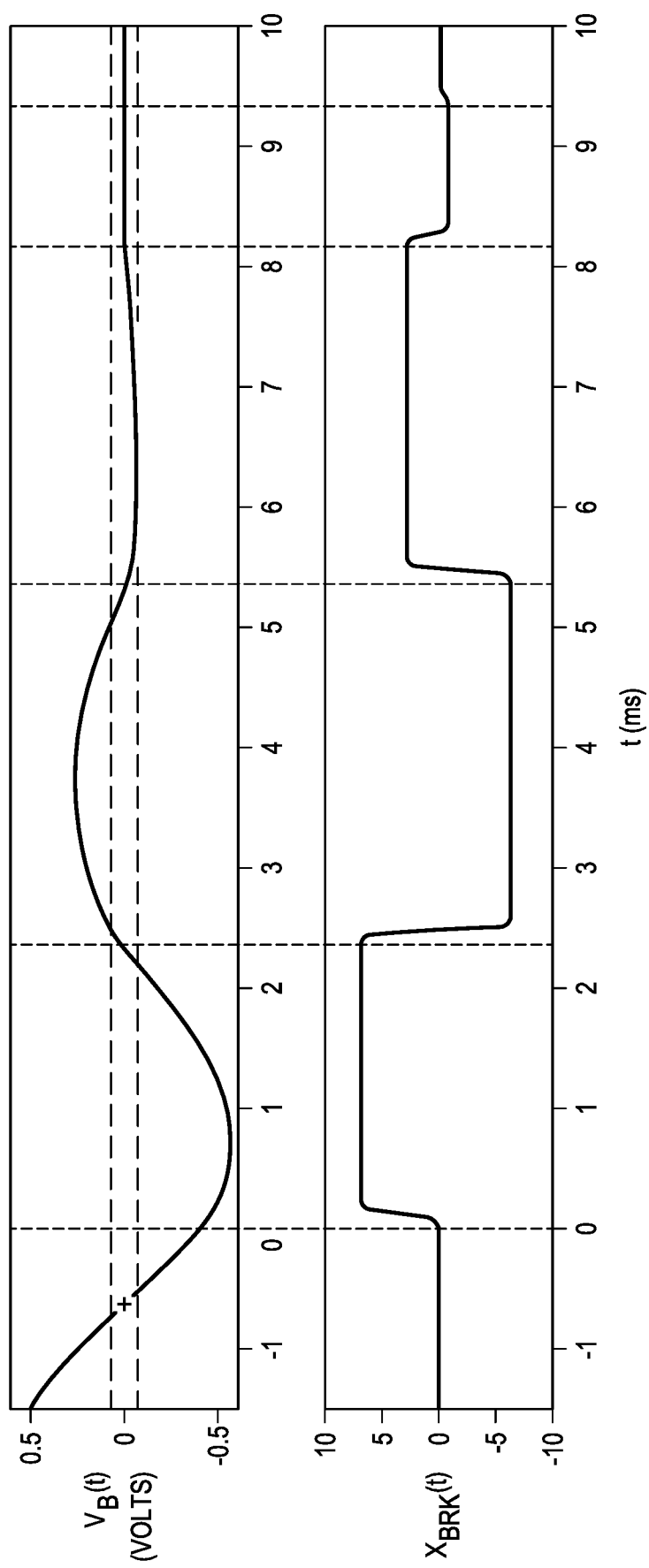
FIG. 4 illustrates a graph depicting an estimated transducer back electromotive force versus time and an active braking signal based on the estimated transducer back electromotive force versus time, in accordance with embodiments of the present disclosure.

FIG. 4 illustrates a graph depicting an estimated back-EMF voltage $V_B(t)$ and braking signal $x_{BRK}(t)$ generated based on estimated back-EMF voltage $V_B(t)$, in accordance with embodiments of the present disclosure. As is shown in FIG. 4, at a time t=0, corresponding to the end of a playback signal (and thus, the beginning of a braking phase) for electromagnetic load 301, braking subsystem 310 may begin generating braking signal $x_{BRK}(t)$ with a magnitude proportional to and opposite in polarity from the derivative with respect to time of estimated back-EMF voltage $V_B(t)$ at the previous zero crossing of estimated back-EMF voltage $V_B(t)$ in accordance with equation (4) above. At subsequent zero crossings of estimated back-EMF voltage $V_B(t)$, braking subsystem 310 may adaptively modify amplitude $A_{BRK}$ of braking signal $x_{BRK}(t)$ in accordance with equation (4) above, with such zero crossing serving to synchronize modification of amplitude $A_{BRK}$. Braking subsystem 310 may generate braking signal $x_{BRK}(t)$ and adapt its magnitude until such time as estimated back-EMF voltage $V_B(t)$, its derivative with respect to time at a zero crossing of estimated back-EMF voltage $V_B(t)$, or some other parameter indicates that electromagnetic load 301 has settled to an acceptable amount.

In some embodiments, braking subsystem 310 may simplify calculation and generation of braking signal $x_{BRK}(t)$ compared to that discussed above. For instance, if coil inductance Le of electromagnetic load 301 is very small compared to its DC resistance Re, equation (3) above may be approximated by:

$$V_B(t) = V_T(t) - Re \cdot 1(t) \qquad (5)$$

Use of such approximation for estimated back-EMF voltage $V_B(t)$ by braking subsystem 310 may simplify calculation or may reduce processing resource requirements by eliminating the need to calculate $$\frac{dI(t)}{dt}.$$

Furthermore, if DC resistance Re is not available, the polarity and derivative of estimated back-EMF voltage $V_B(t)$ may still be determined if $V_T(t)=0$, which further simplifies equation (4) above to:

$$V_B(t) \approx -Re \cdot 1(t) \propto -1(t) \qquad (5)$$

Under this approximation, estimated back-EMF voltage $V_B(t)$ is in phase with current I(t). When the moving mass of electromagnetic load 301 is at a no-rest state and driving signal V(t) is set to zero, the mass of electromagnetic load 301 may oscillate at its resonance frequency $f_0$ with an exponentially decaying amplitude. In this state, electromagnetic load 301 may also be considered at resonance, meaning that the residual motion of the mass in the LRA may elicit current I(t) which is in phase with the velocity of the oscillation of the mass. Thus, in such scenario, braking subsystem 310 may effectively minimize settling time by measuring current I(t) alone, determining a direction and magnitude of the velocity of the moving mass of electromagnetic load 301 based on measured current I(t), and generating braking signal $x_{BRK}(t)$ to oppose such motion indicated by measured current I(t).

Although the foregoing contemplates that measurement of estimated back-EMF voltage $V_B(t)$ and the application of braking signal $x_{BRK}(t)$ may occur at the same time, in some embodiments the measurement of estimated back-EMF voltage $V_B(t)$ and the application of braking signal $x_{BRK}(t)$ may occur at different times. In such other embodiments, piecewise periods of sensing and braking may lead to a desired minimization of settling time.

Furthermore, in some embodiments, braking subsystem 310 may appropriately limit braking signal $x_{BRK}(t)$ so as to not exceed allowable operational ranges for parameters associated with electromagnetic load 301 (e.g., to ensure a maximum voltage and maximum current applied to electromagnetic load 301 does not exceed maximum ratings of electromagnetic load 301).

In addition, while the foregoing contemplates braking subsystem 310 generating a piecewise square braking signal $x_{BRK}(t)$, in some embodiments, braking subsystem 310 may generate pieces of braking signal $x_{BRK}(t)$ to have any suitable waveform shape provided such shape and amplitude thereof serve to reduce a velocity of the moving mass of electromagnetic load 301.

In these and other embodiments, braking subsystem 310 may also be configured to compensate for undesired effects that may lead to measurement inaccuracy. For example, in some embodiments braking subsystem 310 may determine a measurement offset for estimated back-EMF voltage $V_B(t)$ by measuring estimated back-EMF voltage $V_B(t)$ when driving signal V(t) is set to zero, and add a compensation factor to its measurements of estimated back-EMF voltage $V_B(t)$ to counter such offset. As another example, in these and other embodiments, braking subsystem 310 may compensate for noise in measurement of estimated back-EMF voltage $V_B(t)$ by applying filtering (e.g., low-pass filtering) to measurements of estimated back-EMF voltage $V_B(t)$.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for minimizing settling of a moving mass of an electromagnetic load, comprising:
   determining a polarity and a magnitude of a velocity of the moving mass based on real time measurements of one or more parameters associated with the electromagnetic load; and
   based on the polarity and the magnitude of the velocity, generating a braking signal to be applied to the moving mass that opposes the polarity of the velocity, wherein generating the braking signal comprises scaling a magnitude of the braking signal to a derivative with respect to time of the magnitude of the velocity at a time in which the magnitude of the velocity as a function of time is approximate to zero.

2. The method of claim 1, wherein generating a braking signal comprises adapting a polarity and a magnitude of the braking signal over time.

3. The method of claim 2, further comprising synchronizing the adaptation of the polarity and the magnitude of the braking signal based on when the magnitude of the velocity with respect to time crosses zero.

4. The method of claim 1, wherein generating the braking signal comprises scaling a magnitude of the braking signal to the magnitude of the velocity.

5. The method of claim 1, wherein the one or more parameters associated with the electromagnetic load comprises a back-electromotive force associated with the electromagnetic load.

6. The method of claim 5, wherein generating the braking signal comprises scaling a magnitude of the braking signal to a derivative with respect to time of the back-electromotive force at a time in which the back-electromotive force as a function of time is approximate to zero.

7. The method of claim 5, wherein:
   generating a braking signal comprises adapting a polarity and a magnitude of the braking signal over time; and
   further comprising synchronizing the adaptation of the polarity and the magnitude of the braking signal based on when a magnitude of the back-electromotive force as a function of time crosses to zero.

8. The method of claim 1, wherein the one or more parameters associated with the electromagnetic load comprises a measured current associated with the electromagnetic load.

9. The method of claim 8, wherein the one or more parameters associated with the electromagnetic load further comprises a measured voltage associated with the electromagnetic load.

10. The method of claim 9, wherein the one or more parameters associated with the electromagnetic load further comprises a direct-current resistance associated with the electromagnetic load.

11. The method of claim 1, wherein the electromagnetic load comprises a haptic transducer.

12. A system for minimizing settling of a moving mass of an electromagnetic load, comprising:
   one or more inputs for receiving real time measurements of one or more parameters associated with the electromagnetic load; and
   a processing subsystem configured to:
      determine a polarity and a magnitude of a velocity of the moving mass based on real time measurements of one or more parameters associated with the electromagnetic load; and based on the polarity and the magnitude of the velocity, generate a braking signal to be applied to the moving mass that opposes the polarity of the velocity, wherein generating the braking signal comprises scaling a magnitude of the braking signal to a derivative with respect to time of the magnitude of the velocity at a time in which the magnitude of the velocity as a function of time is approximate to zero.

13. The system of claim 12, wherein generating a braking signal comprises adapting a polarity and a magnitude of the braking signal over time.

14. The system of claim 13, wherein the processing subsystem is further configured to synchronize the adaptation of the polarity and the magnitude of the braking signal based on when the magnitude of the velocity with respect to time crosses zero.

15. The system of claim 12, wherein generating the braking signal comprises scaling a magnitude of the braking signal to the magnitude of the velocity.

16. The system of claim 12, wherein the one or more parameters associated with the electromagnetic load comprises a back-electromotive force associated with the electromagnetic load.

17. The system of claim 16, wherein generating the braking signal comprises scaling a magnitude of the braking signal to a derivative with respect to time of the back-electromotive force at a time in which the back-electromotive force as a function of time is approximate to zero.

18. The system of claim 16, wherein:
generating a braking signal comprises adapting a polarity and a magnitude of the braking signal over time; and
wherein the processing subsystem is further configured to synchronize the adaptation of the polarity and the magnitude of the braking signal based on when a magnitude of the back-electromotive force as a function of time crosses to zero.

19. The system of claim 12, wherein the one or more parameters associated with the electromagnetic load comprises a measured current associated with the electromagnetic load.

20. The system of claim 19, wherein the one or more parameters associated with the electromagnetic load further comprises a measured voltage associated with the electromagnetic load.

21. The system of claim 20, wherein the one or more parameters associated with the electromagnetic load further comprises a direct-current resistance associated with the electromagnetic load.

22. The system of claim 12, wherein the electromagnetic load comprises a haptic transducer.

\* \* \* \* \*